US008347506B2

(12) United States Patent
Fuller

(10) Patent No.: US 8,347,506 B2
(45) Date of Patent: Jan. 8, 2013

(54) METHOD FOR PRODUCING ENGINEERED WOOD FLOORING AND PRODUCT

(75) Inventor: Barry Shannon Fuller, Raymond, MS (US)

(73) Assignee: Wolf, Incorporated, Jackson, MI (US)

( * ) Notice: Subject to any disclaimer, the term of this patent is extended or adjusted under 35 U.S.C. 154(b) by 615 days.

(21) Appl. No.: 12/633,382

(22) Filed: Dec. 8, 2009

(65) Prior Publication Data

US 2010/0139095 A1 Jun. 10, 2010

Related U.S. Application Data

(60) Provisional application No. 61/120,554, filed on Dec. 8, 2008.

(51) Int. Cl.

| | |
|---|---|
| ***B32B 37/28*** | (2006.01) |
| ***B32B 37/12*** | (2006.01) |
| *B32B 7/12* | (2006.01) |
| *B32B 21/13* | (2006.01) |
| *B32B 21/14* | (2006.01) |

(52) U.S. Cl. ...... 29/897.32; 29/430; 29/527.2; 144/346; 144/352; 156/153

(58) Field of Classification Search ............... 29/897.32, 29/430, 527.2, 564.1, 564.7, 564.8, 564; 428/537.1, 534, 535; 156/153, 256, 257; 144/344–346, 352
See application file for complete search history.

(56) References Cited

U.S. PATENT DOCUMENTS

| | | | | | |
|---|---|---|---|---|---|
| 482,536 | A | * | 9/1892 | Zagelmeyer, A. | 404/46 |
| 2,113,076 | A | * | 4/1938 | Bruce | 144/353 |
| 2,500,564 | A | * | 3/1950 | Pettersson et al. | 280/610 |
| 3,320,984 | A | * | 5/1967 | Stolesen et al. | 144/355 |
| RE28,627 | E | * | 11/1975 | Clausen et al. | 156/433 |
| 4,968,549 | A | * | 11/1990 | Smimizu et al. | 428/106 |
| 5,059,474 | A | * | 10/1991 | Yoshida | 428/174 |
| 5,062,915 | A | * | 11/1991 | Yoon et al. | 156/252 |
| 5,474,831 | A | * | 12/1995 | Nystrom | 428/174 |
| 5,560,409 | A | * | 10/1996 | Knorr | 144/350 |
| 5,881,786 | A | * | 3/1999 | Wilderman et al. | 144/348 |
| 5,944,938 | A | * | 8/1999 | Winterowd et al. | 156/315 |
| 6,004,648 | A | * | 12/1999 | Snyder | 428/106 |
| 6,156,402 | A | * | 12/2000 | Smith | 428/40.1 |
| 7,322,159 | B2 | * | 1/2008 | Stone et al. | 52/741.3 |
| 7,381,474 | B2 | * | 6/2008 | Wilson et al. | 428/532 |
| 7,458,191 | B2 | * | 12/2008 | Stone | 52/591.4 |
| RE41,347 | E | * | 5/2010 | Tsutsui et al. | 156/304.1 |

* cited by examiner

*Primary Examiner* — David Bryant
*Assistant Examiner* — Jason L Vaughan
(74) *Attorney, Agent, or Firm* — Shumaker, Loop & Kendrick, LLP

(57) ABSTRACT

A method for manufacturing an engineered wood flooring product including providing a flat plywood platform having an original thickness, sanding top and bottom surfaces of the platform to achieve a final thickness less than the original thickness, wherein the amount of material removed from the bottom surface is greater than the top surface to induce center lift in the platform, applying adhesive to the platform, applying a veneer face to the platform, and subjecting the lay-up to a lineal pressing system to ensure bonding.

15 Claims, 4 Drawing Sheets

METHOD FOR PRODUCING ENGINEERED WOOD FLOORING AND PRODUCT

CROSS-REFERENCE TO RELATED APPLICATION

This application claims priority to U.S. Provisional Application No. 61/120,554 filed Dec. 8, 2008 and entitled "METHOD FOR PRODUCING ENGINEERED WOOD FLOORING AND PRODUCT", the contents of which are incorporated by reference herein.

FIELD OF THE INVENTION

The present invention relates generally to the field of manufacturing engineered wood flooring, and more particularly, to a method for manufacturing engineered wood flooring including utilizing a polyurethane reactive hot-melt adhesive and pressing system to join a veneer face and support platform of predetermined dimensions to yield an engineered wood blank, and sanding and treating the blank to produce engineered wood flooring, and an engineered wood flooring product produced by the method provided herein.

BACKGROUND OF THE INVENTION

Solid wood flooring alternatives have been developed for those that desire the look of hardwood flooring, but who may be limited by budget, installation skill, installation location and environmental concerns. The term "hardwood flooring" is commonly used to refer to both hard and soft varieties of solid wood milled into a tongue-and-groove configuration. Examples include oak, beech, ash, cherry, pine and bamboo, among others. While hardwood flooring is desirable due to its natural look and ability to be re-finished multiple times depending upon thickness, it typically must be installed by a skilled hardwood floor installer, is susceptible to damage from exposure to moisture, and is costly.

One alternative to solid hardwood flooring is laminate flooring. Laminate flooring typically includes a base substrate such as a wood-chip composite or fiberboard core of a predetermined thickness, a surface layer made up of thin sheets of paper impregnated with melamine to provide the specific look, color and "grain", and a durable, transparent top layer for impact, scratch and moisture resistance. Laminate flooring is desirable in that it is generally less costly than hardwood flooring, and planks may be easily installed by unskilled labor by snapping, gluing or otherwise securing planks together. While laminate flooring is desirable in that any image may be printed on the surface layer, it is undesirable when trying to achieve the natural look of wood, as wood grain is simulated through a photograph. Further, laminate flooring is undesirable in that it cannot be refinished and is often noisy under foot when not glued in place.

Another alternative to hardwood flooring is engineered wood flooring, and it is with respect to this type of flooring that this particular invention finds application. Engineered wood flooring is made from real wood, and typically includes a predetermined thickness of finish wood applied on top of an unfinished layered base. The top finish layer is often "pre-finished", meaning that each plank comes sanded, stained and sealed, which is in contrast to solid hardwood flooring that is typically finished on site after installation. Like solid hardwood flooring, engineered wood flooring can be sanded to remove scratches, but the number of times and depth of sanding is limited by the thickness of the finish layer. Unlike hardwood flooring, which is susceptible to damage from moisture and must be nailed to a wooden sub-floor, engineered flooring may be installed where light moisture is present and can be glued down as well as nailed to a wooden sub-floor.

Engineered wood flooring is conventionally manufactured by stacking multiple layers of solid wood, such as in a cross-ply construction, with the top layer of the stack being the visible layer when the plank is installed. Conventional manufacturing methods are labor intensive, costly and require a large amount of manufacturing floor space. Accordingly, it is desirable to provide a novel method of manufacturing engineered wood flooring that combines aspects of conventional engineered and solid production processes with novel lineal pressing technology to create a manufacturing system that requires less labor, costs and space than conventional systems. It is further desirable to provide a manufacturing system that facilitates the production of reclaimed species of wood, such as heart pine, oak, chestnut and others which can be exceedingly difficult to press and process with conventional systems.

BRIEF SUMMARY OF THE INVENTION

In one aspect, systems and methods are provided for manufacturing engineered wood flooring.

In another aspect, a method includes combining a calibrated veneer face and plywood platform of predetermined width and length utilizing a polyurethane reactive hot-melt adhesive.

In yet another aspect, an engineered wood flooring manufacturing system is provided including a plywood platform ripping unit, dual-surface multi-head sanding unit, adhesive delivery unit and glue-spreading unit, among other components.

In yet another aspect, a pressing system is provided for bringing the veneer face, adhesive and plywood platform into intimate contact under predetermined pressures and times to yield an engineered wood blank.

In yet another aspect, a pressing system is provided including an independent pre-press and a lineal roller press for applying a predetermined, uniform, pneumatically controlled pressure to the veneer face and plywood platform.

In yet another aspect, an engineered wood flooring manufacturing system is provided including a machining unit for machining an engineered wood blank.

In yet another aspect, the method includes unequal sanding of the top and bottom of the plywood platform to induce a downwardly concave platform that lays flat when the veneer is applied.

To achieve the foregoing and other aspects and advantages of the present invention, in one embodiment a method for manufacturing an engineered wood flooring product is provided including providing a generally flat plywood platform having an original thickness, sanding a top surface and a bottom surface of the plywood platform to achieve a consistent final thickness less than the original thickness, wherein an amount of material removed from the bottom surface of the plywood platform is greater than an amount of material removed from the top surface to induce bowing to the back in the plywood platform, applying adhesive to the top surface of the plywood platform, applying a veneer face to the top surface of the plywood platform, and subjecting the adhered plywood platform and venner face to a lineal bonding system to ensure bonding between the plywood platform and the veneer face.

In further embodiments, the final thickness of the plywood platform is about 85% to 90% of the original thickness and the ratio of the amount of material removed from the bottom surface compared to the amount of material removed from the top surface is about 3:1. In further embodiments the method includes providing a generally balanced plywood sheet, simultaneously ripping the plywood sheet into a plurality of plywood platforms each having a predetermined dimension, applying a transparent cover layer to a top surface of the veneer face, and subjecting the wood flooring product to an ultra-violet curing process.

In a still further embodiment, the lineal pressing system includes a pre-press roller assembly and a lineal roller press, the pre-press roller assembly including driven upper and lower rollers defining a gap therebetween for allowing the adhered platform and veneer face to be fed through under pressure applied at a nip of the rollers, and the lineal roller press including a series of pairs of corresponding upper and lower rollers defining a gap therebetween secured to a common frame in which pressure is applied thereto via at least one pneumatic actuator.

In another embodiment, the present invention provides a method for manufacturing an engineered wood flooring product including providing a generally flat plywood platform having an original thickness, sanding a top surface and a bottom surface of the plywood platform to achieve a final thickness less than the original thickness, wherein an amount of material removed from the bottom surface compared to an amount of material removed from the top surface is in a ratio of about 3:1 to induce center lift in the plywood platform, applying adhesive to the top surface of the plywood platform, and applying a veneer face to the top surface of the plywood platform. The method further includes subjecting the adhered plywood platform and venner face to a lineal pressing system to ensure bonding between the plywood platform and the veneer face.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring now to the figures, systems and methods for manufacturing engineered wood flooring are shown and described. Throughout the specification, the terms engineered wood flooring “plank” and “lay-up” are intended to refer to an engineered wood flooring product in its various stages of manufacture from unfinished to sealed and finished, and include an arrangement of a veneer face applied onto a top surface of a supportive platform utilizing an adhesive bonding layer. Veneer faces may be provided pre-cut in any desired length, width and thickness, while the plywood platforms are cut to size during the manufacturing process. Veneer faces may be of any wood species. Platform materials include plywood or other unfinished support structure such as, but not limited to, oriented strand board (OSB), particleboard and fiberboard. Planks may be produced in any desired width, such as 3", 3½", 4" and 5" widths, among others. Exemplary plank thicknesses include ¼", ½" and ¾" thicknesses, among others.

Figure 1:
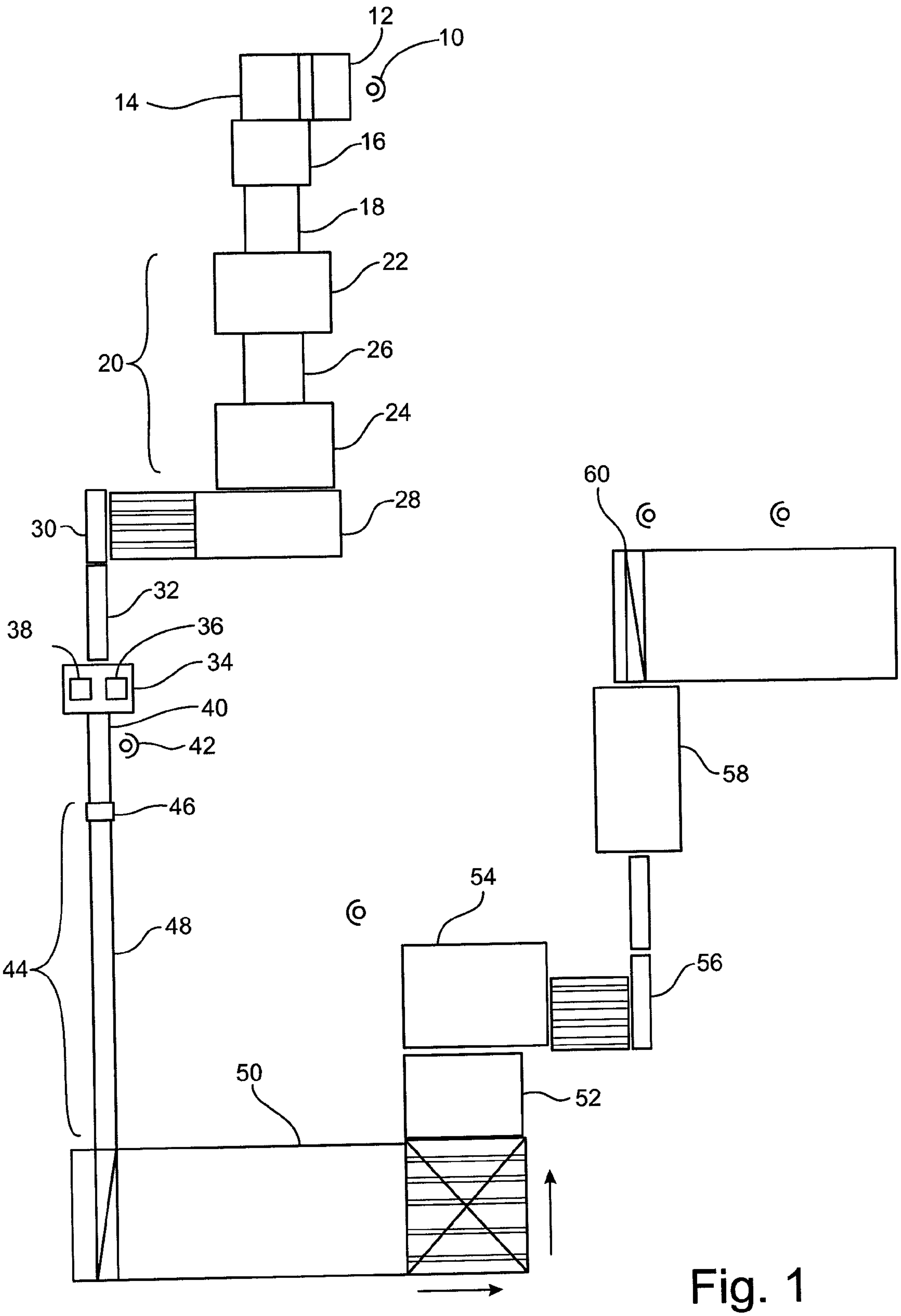
FIG. 1 is a schematic diagram illustrating a system for manufacturing engineered wood flooring in accordance with an embodiment of the invention.

Referring specifically to FIG. 1, a schematic diagram illustrating a system for manufacturing an engineered wood flooring product according to an embodiment of the invention is provided. Generally, the system includes a plurality of units for performing specific tasks that are interconnected by a series of conveyors for moving the product in its various stages of manufacture between units. All or portions of the system may be automated, and a control module running a software application may be provided for controlling various aspects of the system including, but not limited to, processing times, speeds, adhesive flow rates, pressures, conveyor speeds, cut widths, sanding pressures UV curing times, among others.

As shown, the system includes a supply of plywood stock 10 in the form of sheets of predetermined sizes (e.g., 5'×5', 4'×8', etc.) and thicknesses (e.g., 9.0 mm and 12.0 mm, etc.). Plywood may be of domestic or foreign origin, for example multi-ply Russian Birch plywood. The number of veneer plys in the plywood platform may vary, such as from about 3-17 plys, with 9-13 plys being preferred. Various thicknesses of finished wood flooring may be achieved by combining a plywood platform thickness with a lesser veneer thickness. Plywood sheets are fed from the supply stock 10 by way of an in-feed conveyor 12. Another conveyor 14, such as a canted roll conveyor, is provided for transferring plywood sheets to a ripping unit 16, such as a ripsaw. The ripping unit 16 includes a plurality of cutting members (e.g., routing bits, blades, etc.) for cutting the sheets into desired plank widths. The dimensions of a sheet selected for cutting is preferably chosen to optimize the number of planks per sheet while reducing scrap. All cuts to a sheet are preferably made simultaneously as the sheet passes through the ripping unit 16 such that only one pass per sheet through the ripping unit 16 is required.

An additional conveyor 18 is provided for transferring ripped platforms to a sanding unit 20 that includes bottom and top multi-head sanders 22 and 24, respectively, and in that order. As shown, the bottom and top multi-head sanders 22 and 24 are separate units, and transportation between sanders is achieved via a conveyor 26, such as a belt conveyor. The bottom and top surface sanding units are adjusted to sand the bottom and top surfaces of the plywood platforms achieve a predetermined platform thickness, shape and surface characteristic. Platforms may be sanded to a uniform thickness to prepare them for receiving adhesive as well as remove any thickness variations that may exist. Platforms may also be sanded to control the "bow" and/or end lift in the platforms by removing material from the back or face of the platform as needed. Proper sanding is critical to achieve a uniformly flat surface upon which the veneer face will adhere.

Figure 7:
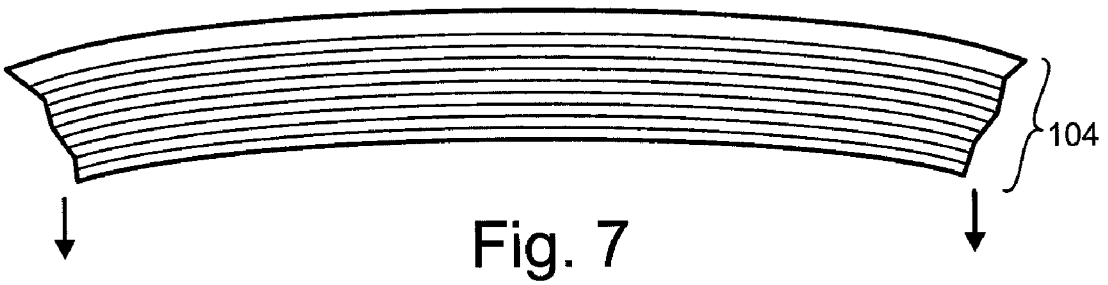
FIG. 7 is an illustration of a plywood platform sanded according to a method of the present invention to induce “center lift”
Figure 8:
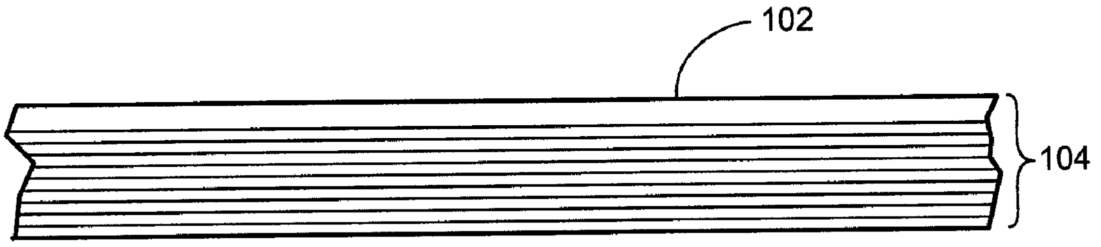
FIG. 8 is an illustration of the plywood platform of FIG. 7 shown with the veneer applied and being substantially flat.

In the preferred embodiment, the desired plywood platform includes from about 9-13 plys and is received in a relatively flat or "balanced" state with a preferred equilibrium moisture content of about 6-10%. During the platform calibration process, the plywood platform is sanded on the top and bottom to achieve a consistent final thickness from about 70% to 95% of the original thickness, more preferably from about 85% to 95% of the original thickness. For a plywood platform having a starting thickness of about 9.0 mm, the platform is calibrated (i.e. sanded) to a final thickness of about 8.2 mm+/−about 0.2 mm. For a plywood platform having a starting thickness of about 12.0 mm, the platform is calibrated to a final thickness of about 10.2 mm+/−0.2 mm. During the calibration process, the plywood platform is made to be "unbalanced" by sanding the bottom side more than the top. This method of calibration throws the platform "out of balance" and causes the resulting strip of plywood 104 to have a "center lift" or "bow to the back" as shown in FIG. 7 The term "bow to the back" describes the top surface of the plywood platform, to which the veneer face is applied, having a convex shape. The center lift is achieved by maintaining a ratio between the amount of material removed from the bottom versus the amount removed from the top. The preferred ratio is 3:1, thus for a 9.00 mm incoming thickness calibrated to 8.2 mm, 0.6 mm is sanded off of the bottom of the platform and 0.2 mm is sanded from the top to induce the bow. When the adhesive and sawn wood veneer 102, or lamella, is applied to the calibrated plywood platform 104 as described below in detail, the resulting flooring blank lays flat or is just slightly bowed to the back as shown in FIG. 8 as a result of tension in the veneer face "pulling" the plywood platform back towards balanced. A balanced or slightly bowed to the back shape is desired for high quality engineered wood flooring, in contrast to flooring that is "bowed to the face", making it difficult to install. Thus, the method provided herein induces a bow to the back to prevent a bow to the face (i.e. end lift) when the veneer face is applied.

Once sanded, a conveyor 28 is provided for transferring the sanded platforms to a lateral feeder 30 for feeding individual platforms laterally to a conveyor 32 for feeding a glue application unit 34. The glue application unit 34 includes a hot-melt adhesive spreader 36 fed by a hot-melt adhesive delivery unit 38. The adhesive delivery unit 38 is operable for preheating the polyurethane reactive hot-melt adhesive and delivering it to the adhesive spreader 36, which in one embodiment applies the adhesive through at least one roller in contact with the top surface of the platform. Various formulations of adhesive may require specific delivery temperatures, which may be controlled via a control module. The flow rate of the adhesive delivery unit 38 may be adjustable to accommodate various adhesive formulations. The adhesive spreader preferably applies the adhesive in a sufficient amount and/or uniform thickness to substantially the entire top surface of the platform to optimize the bonding surface and prevent delamination.

A laminating table 40 is provided at which the sawn wood veneer faces are applied, either manually or automatically, to the adhesive coated platforms. The laminating table 40 is preferably in proximity to a supply of pre-cut veneer stock 42, such as sawn or rotary produced veneer. In one embodiment, veneer faces are initially applied by manually positioning and with pressure adequate to ensure adhesion between the veneer face and platform to prevent translation prior the next manufacturing step. A jig or guiding wall may be provided for facilitating veneer face application and positioning. In one embodiment, a single veneer face having a length about corresponding to the length of the platform may be applied. In an alternative embodiment, multiple veneer face pieces may be applied to a single platform to achieve a desired effect.

A lineal pressing system 44 is provided for applying pressure to the arranged layers to ensure adequate surface bonding. The lineal pressing system 44 includes a pre-press roller assembly 46 and lineal roller press 48. The veneer face, adhesive and platform lay-up first traverses through the pre-press roller assembly 46, where top and bottom rollers contact the veneer face and platform, respectively, and apply a specific, pneumatically-controlled, pressure to preferably the entire surface area of the lay-up. The Pre-press roller assembly 46 ensures that every square inch of the lay-up receives the same amount of pressure to bring the veneer face into intimate contact with the adhesive and plywood platform. The pre-press is responsible for full and complete adhesion and prevents delamination.

The lay-up traverses through the pre-press roller assembly 46 to the lineal roller press 48, which functions to apply a predetermined pressure to the lay-up for a specific period of time until the adhesive is adequately cured to hold the veneer firmly and permanently on the plywood platform. As described in FIGS. 5 and 6 below, the length of the lineal roller press 48 me be adjusted to provide the desired cure time and is achieved through the number of pairs of rollers. The lay-up is preferably exposed to the pressures of the lineal roller press 48 for a time period greater than that of the rollers of the pre-press 46. The speed and time of exposure to the pre-press 46 and lineal roller press 48 may be varied to accommodate for a variety of adhesive cure times. Again, the composition of the adhesive is preferably optimized to increase bond strength and prevent delamination, and may be adjusted based upon the predetermined plank materials, thicknesses and pressures applied.

Pressed and cured lay-ups are then flipped to position the plywood side up (i,e, bottom side up), which may be accomplished through automation or manually. In one embodiment, lay-ups may be stacked and given time to further cure prior to proceeding to the next processing step. In another embodiment, the lay-ups may be flipped and loaded onto a conveyor 50 for feeding into a bottom head, veneer face sanding unit 52 for sanding the veneer face of the lay-up about 0.005" or as needed.

A conveyor 54 and auto lateral chain feeder 56 are provided for transporting the calibrated planks to a conventional moulder 58. The moulder 58 is operable for creating the side tongue-and-groove or like interconnecting features in the planks. The planks may be introduced into the moulder 58 in either the venner face-up or face-down configuration. In the embodiment shown, the planks are introduced in the face-down configuration and are flipped subsequent to moulding at 60. Moulded planks are then down-stacked onto pallets and moved to a conventional UV-finishing line to be finished, end-matched and packaged.

Figure 2:
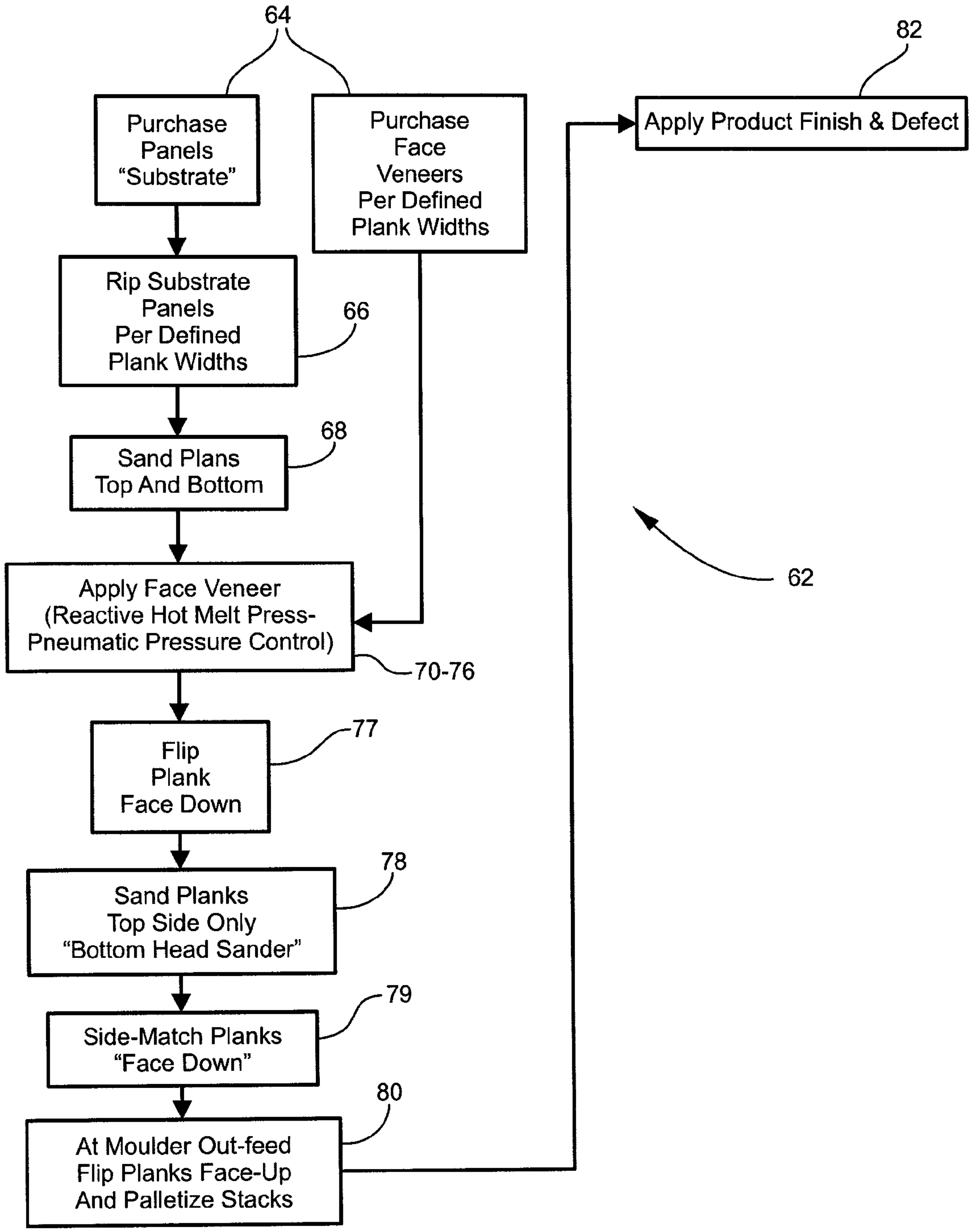
FIG. 2 is a flowchart illustrating a method for manufacturing engineered wood flooring in accordance with an embodiment of the invention.

Referring to FIG. 2, the method for manufacturing engineered wood flooring is shown generally at 62. The method includes the following steps, of which the order is not intended to be limiting: providing support platform sheets as described above to be cut and pre-cut wood veneer faces (Step 64); ripping the plywood sheets to a desired width to produce support platforms (Step 66); sanding the top and bottom surfaces of the support platforms as described above to produce a desired thickness, induce bow to the back, and remove surface thickness irregularities (Step 68); applying adhesive to the top surface of the support platforms (Step 70); applying at least one veneer face to each support platform (Step 72); subjecting the entire length of the platform, veneer face and adhesive lay-up to a pre-press operable for applying an amount of pressure sufficient to achieve intimate contact between the veneer face and support platform (Step 74); subjecting the lay-up to a lineal roller system operable for maintaining pressure for a predetermined period of time to allow the adhesive to cure (Step 76); flipping the plank face down (Step 77); sanding the veneer face to provide a uniform lay-up thickness (Step 78); side matching planks face down (Step 79); creating tongue-and-groove interconnecting features in the sides of the planks (Step 80), and; finish processing the planks (Step 82). Defects, specifications and performance testing may be performed at any step of the process to ensure quality control. Planks that do not meet predefined standards may be discarded or re-subjected to any of the above-described processing steps.

Figure 3:
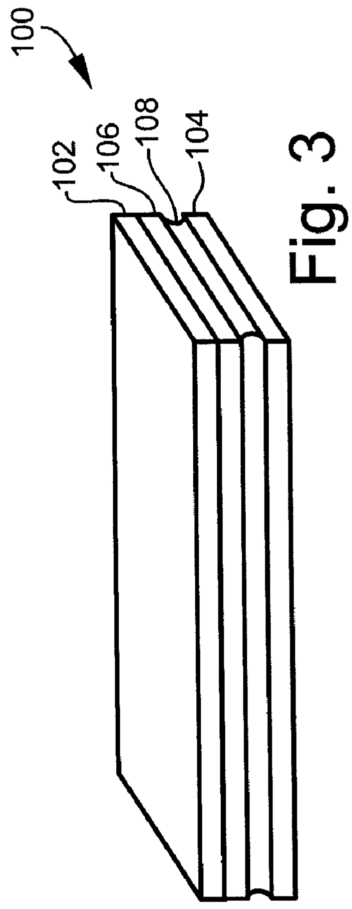
FIG. 3 is a perspective view of an engineered wood flooring product illustrating the layered arrangement.

Referring to FIG. 3, an engineered wood flooring product produced according to the methods described herein is shown generally at 100. The product 100 includes a veneer face 102 and a plywood support platform 104 adhered together with an adhesive layer 106. The product 100 further includes a durable, transparent layer applied to the top surface of the venner face 102. The product 100 further includes conventional tongue-and-groove features 106 defined in the plywood platform for interconnecting planks. The product may have any desired dimensions.

Figure 5:
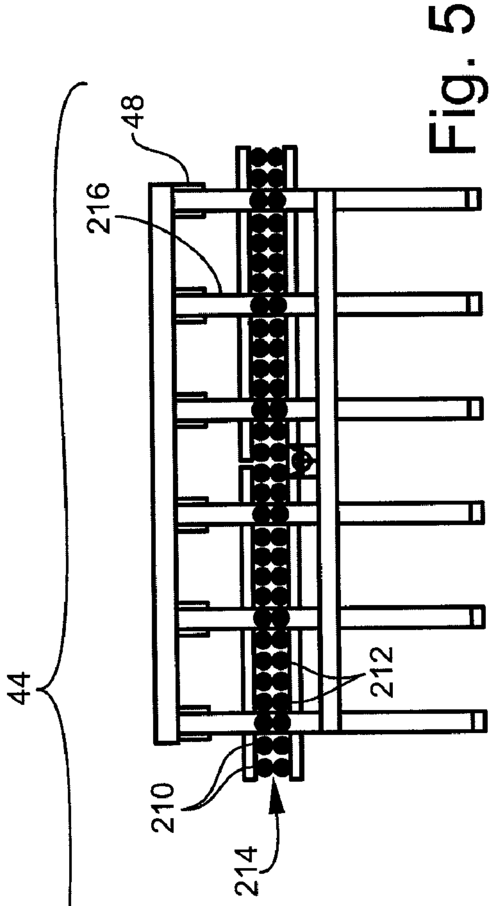
FIG. 5 is a side view of a schematic illustration of a lineal press for applying predetermined pressure to an assembled plank for a predetermined time period.
Figure 4:
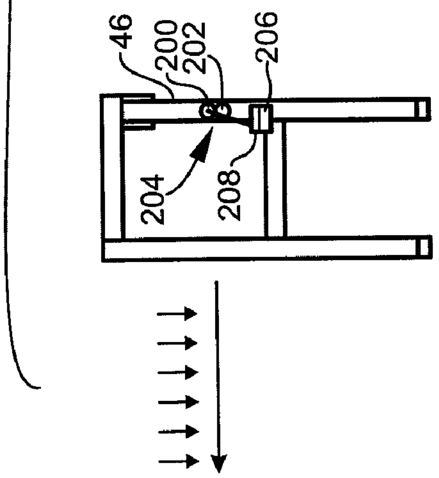
FIG. 4 is a schematic illustration of a pneumatic pre-press for pressing layers of and assembled engineered wood flooring product together.
Figure 6:
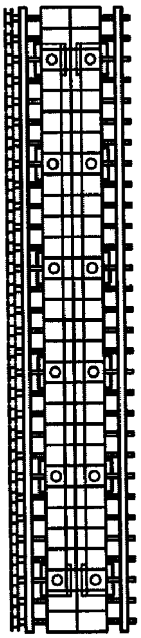
FIG. 6 is a top view of the lineal press of FIG. 5.

Referring to FIG. 4-6, the lineal pressing system according to one embodiment of the invention is shown generally at 44. The lineal pressing system 44 includes a pre-press roller assembly 46 and lineal roller press 48. The pre-press roller assembly 46 includes driven upper and lower rollers, 200 and 202, defining a gap 204 therebetween for allowing a lay-up to be fed through under pressure applied at the nip of the rollers. The upper roller 200 is linked to a mechanical stop 206 for preventing contact between rollers. A wedge 208 having a thickness corresponding to the thickness of the lay-up may be provided to limit the travel of the upper roller 200 and define the height of the gap 204. The lineal roller press 48 includes a series of pairs of corresponding upper and lower rollers, 210 and 212, defining a gap 214 therebetween, each pair for feeding the lay-up through under pressure. The complete set of upper rollers are secured to a common frame in which pressure is applied thereto via at least one pneumatic actuator 216. In an exemplary embodiment, the lineal roller press 48 includes from about 10 to about 50 pairs of corresponding upper and lower rollers, and a lay-up traverses the lineal pressing system at a speed sufficient to allow the adhesive to cure, such as about 70 fpm.

While systems and methods for manufacturing engineered wood flooring products have been described with reference to specific embodiments and examples, it is envisioned that various details of the invention may be modified without departing from the spirit and scope of the invention. Furthermore, the foregoing description of the preferred embodiments of the invention and best mode for practicing the invention are provided for the purpose of illustration only and not for the purpose of limitation.

What is claimed is:

1. A method for manufacturing an engineered wood flooring product, comprising:

providing a generally flat plywood platform having an original thickness;

sanding a top surface and a bottom surface of the plywood platform to a consistent final thickness that is less than the original thickness of the plywood platform;

wherein an amount of material removed from the bottom surface of the plywood platform during the sanding step is greater than an amount of material removed from the top surface of the plywood platform during the sanding step;

wherein the removal of the material from the bottom surface of the plywood platform and the top surface of the plywood platform induces bowing in the plywood platform such that the top surface of the plywood platform is formed into a convex shape;

applying adhesive to the top surface of the plywood platform;

applying a veneer face to the top surface of the plywood platform; and bonding the plywood platform to the veneer face by pressing the veneer face onto the plywood platform utilizing a lineal pressing system to form the engineered wood flooring product.

2. The method according to claim 1, wherein the final thickness of the plywood platform is about 85% to 90% of the original thickness.

3. The method according to claim 1, wherein a ratio of the amount of material removed from the bottom surface compared to the amount of material removed from the top surface is about 3:1.

4. The method according to claim 1, further comprising:

providing a generally balanced plywood sheet; and simultaneously ripping the plywood sheet into a plurality of plywood platforms each having a predetermined dimension.

5. The method according to claim 1, further comprising applying a transparent cover layer to a top surface of the veneer face.

6. The method according to claim 5, further comprising subjecting the wood flooring product to an ultra-violet curing process.

7. The method according to claim 1, further comprising sanding the bottom surface of the plywood platform prior to sanding the top surface of the plywood platform.

8. The method according to claim 1, wherein the lineal pressing system includes a pre-press roller assembly and a lineal roller press, the pre-press roller assembly including driven upper and lower rollers defining a gap therebetween for allowing the adhered platform and veneer face to be fed through under pressure applied at a nip of the rollers, and the lineal roller press including a series of pairs of corresponding upper and lower rollers defining a gap therebetween secured to a common frame in which pressure is applied thereto via at least one pneumatic actuator.

9. A method for manufacturing an engineered wood flooring product, comprising:

providing a generally flat plywood platform having an original thickness;

sanding a top surface and a bottom surface of the plywood platform to a final thickness that is less than the original thickness of the plywood platform;

wherein an amount of material removed from the bottom surface during the sanding step compared to an amount of material removed from the top surface of the plywood platform during the sanding step is in a ratio of about 3:1;

wherein the removal of the material from the bottom surface of the plywood platform and the top surface of the plywood platform induces bowing in the plywood platform such that the top surface of the plywood platform is formed into a convex shape;

applying adhesive to the top surface of the plywood platform; and applying a veneer face to the top surface of the plywood platform to form the engineered wood flooring product.

10. The method according to claim 9, wherein the final thickness of the plywood platform is about 85% to 95% of the original thickness.

11. The method according to claim 9, further comprising:

providing a substantially flat plywood sheet; and simultaneously ripping the plywood sheet into a plurality of plywood platforms each having a predetermined dimension.

12. The method according to claim 9, further comprising applying a transparent cover layer to a top surface of the veneer face.

13. The method according to claim 9, further comprising sanding the bottom surface of the plywood platform prior to sanding the top surface of the plywood platform.

14. The method according to claim 9, further comprising subjecting the adhered plywood platform and veneer face to a lineal pressing system to ensure bonding between the plywood platform and the veneer face.

15. The method according to claim 14, wherein the lineal pressing system includes a pre-press roller assembly and a lineal roller press, the pre-press roller assembly including driven upper and lower rollers defining a gap therebetween for allowing the adhered platform and veneer face to be fed through under pressure applied at a nip of the rollers, and the lineal roller press including a series of pairs of corresponding upper and lower rollers defining a gap therebetween secured to a common frame in which pressure is applied thereto via at least one pneumatic actuator.

* * * * *